June 25, 1968  O. D. ENGLEHART ET AL  3,389,984
GLASS SHEET PRESS BENDING APPARATUS WITH INDEXED
COVER OVER THE SHAPING SURFACE
Filed Feb. 11, 1965   3 Sheets-Sheet 1

INVENTORS
OSCAR D. ENGLEHART and
JAMES S. SHUSTER

BY Chisholm and Spencer

ATTORNEYS

INVENTORS
OSCAR D. ENGLEHART and
JAMES S. SHUSTER
BY Chisholm and Spencer
ATTORNEYS

United States Patent Office 3,389,984
Patented June 25, 1968

3,389,984
GLASS SHEET PRESS BENDING APPARATUS WITH INDEXED COVER OVER THE SHAPING SURFACE
Oscar D. Englehart, Brackenridge, and James S. Shuster, Leechburg, Pa., assignors to Pittsburgh Plate Glass Company, Pittsburgh, Pa., a corporation of Pennsylvania
Filed Feb. 11, 1965, Ser. No. 431,840
8 Claims. (Cl. 65—287)

ABSTRACT OF THE DISCLOSURE

Method and apparatus for periodically moving a refractory fabric cover for a glass sheet pressing mold, and particularly, a cover disposed over a pressing mold having a concave shaping surface. The cover is a continuous ribbon attached between a supply roll and a receiving roll disposed on opposite sides of the shaping surface to support the cover over the shaping surface. The receiving roll is periodically indexed to displace said cover a short distance over said shaping surface before the fabric cover frays to present overlapping areas of the fabric cover over the shaping surface. Means are provided to prevent the cover portion covering the shaping surface from wrinkling.

---

The present invention relates to shaping glass sheets, and particularly relates to an improvement in the handling of fabric covers used on pressing molds for shaping glass sheets by a press bending operation.

Glass sheets have been bent to desired shape by heat-softening followed by pressing between a pair of glass shaping members. The glass shaping members that engage the opposite surfaces of the heat-softened glass have convex and concave shaping surfaces, respectively, which conform to the shape desired for the opposite major surfaces of the glass sheet after bending.

Glass shaping members or pressing fixtures of the prior art were composed of either rigid material, such as heavy metal dies difficult to machine to desired shape, or of more easily shaped material, such as plaster of Paris or wood. Rigid shaping members tend to impart local irregularities onto the major surfaces of the heat-softened glass during pressurized contact. Other materials mentioned damage easily on repeated intermittent contact with heat-softened glass.

It has been conventional practice in the press bending art to use a cover of a refractory fibrous material, such as fiber glass, to provide a parting material between the glass and the shaping surface of the pressing fixture that protects either the glass and/or the mold from the irregularities that occur as the result of repeated intermittent contact between the glass and the mold shaping surfaces at relatively high temperature. In the past, such covers have been applied over the mold shaping surfaces and permanently attached or clamped to the sides or rear of the mold shaping members or to attachment members to secure the covers in place.

While several different types of material have been used as covers for press bending members or dies, the material having both the greatest durability and offering the least harm to the optical properties of the shaped glass is a resilient fabric of fiber glass formed from loosely knit texturized fibers applied in unwrinkled condition over the shaping surfaces of the dies. Such a resilient material has the capacity of stretching and readily conforming to changes in configuration resulting from its pressurized engagement between a heat-softened flat glass sheet and a shaping surface of concave or convex configuration.

However, on bending glass sheets to deep bends and/or bends having curved components about both dimensions, the partly stretched knit fiber glass covers were capable of pressing only about 100 glass sheets to shape before the fiber glass cloth cover for the concave glass shaping member or die became frayed and required replacement. The fiber glass cloth cover for the convex shaping member or die could be used for 1,000 to 1,200 shaping operations before it required replacement. While the life of the cover for the convex shaping member could be tolerated for mass-production purposes, commercial operations could not be maintained efficiently, because of the frequent replacement needed for the covers for the concave member.

Every time a glass cloth cover required replacement, production had to be stopped. The greatest cause for cover failure was wearing and fraying of the fiber glass cloth cover around the periphery of the glass pressing area of the concave glass shaping member or die resulting from the shearing action of the glass edge as it contacted the cover each time a sheet was shaped. After repeated pressings or shaping operations, a circular line of wear became apparent on the fiber glass cloth cover. This circular line of wear eventually tore and caused the production line to be shut down until the fiber glass cover could be replaced.

A primary object of the present invention is to increase the production time between stoppages for replacing covers for glass shaping members.

The present invention suggests mounting at least the cover for the concave shaping member in such a way that it can be moved a short distance across the face of the shaping surface after a selected number of shaping operations. In this way, the portions of the cover most susceptible to fraying are removed from the regions of the shaping member causing most rapid wear before the line of wear starts to appear. This technique may also be used for the cover of the convex shaping member, with the knowledge that the latter cover requires less frequent movement than the former cover.

An illustrative apparatus embodiment comprises a roll or continuous ribbon of knit texturized fiber glass cloth mounted on a rotatable shaft located on one side of the concave glass shaping member to the rear of its concave shaping surface. A take-up reel is located to the rear of the glass shaping surface on the opposite side of the concave glass shaping member. The cloth is held in partly stretched condition both longitudinally and transversely across the cavity of the concave glass shaping member to provide its cover. One end of the ribbon is secured to the take-up reel. The take-up reel is intermittently rotated by a ratchet arrangement to move the cover a small distance relative to the concave shaping surface after a preselected number of successive pressurized engagements between the shaping members and the glass to present different overlapping areas of the cover between the shaping surface and the glass before any portion of the cover becomes frayed.

In a particular embodiment of the present invention which will be described for purposes of illustrating the present invention and wherein like reference numerals refer to like structural elements, FIG. 1 is a longitudinal assembly drawing of a furnace and a shaping station;

FIG. 7 is a detailed view taken along the lines VII—VII of FIG. 4; and

FIG. 8 is a schematic circuit diagram of an electric control circuit for periodically actuating the cover advancing mechanism.

Figure 1:
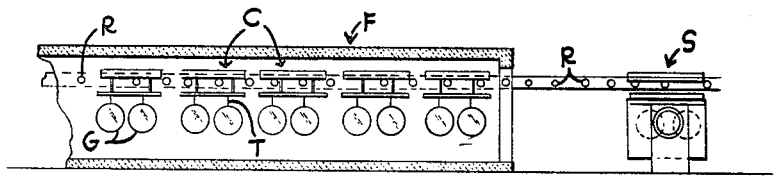

In FIG. 1 of the drawings, a conveyor of stub rolls R is shown traversing a furnace F of tunnel-type configuration and a glass shaping station S. Glass sheets G are gripped above their center of gravity by tongs T suspended from carriages C. The carriages C are provided with runners that ride along the stub rolls R of the conveyor whenever the latter are rotated.

The conveyor is divided into several sections. The rolls R in the various sections are actuated to provide a sequence of movements controlled by the movement of the shaping members of the glass shaping station S in a manner well known in the art.

Figure 2:
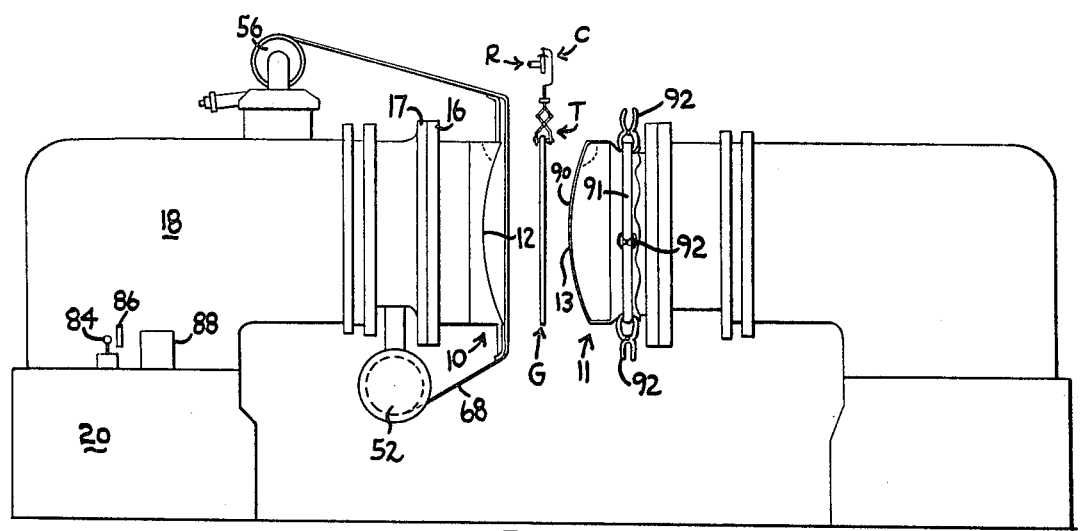
FIG. 2 is a transverse view of glass shaping apparatus provided with a cover advancing mechanism according to the present invention, said apparatus shown in the retracted position.
Figure 3:
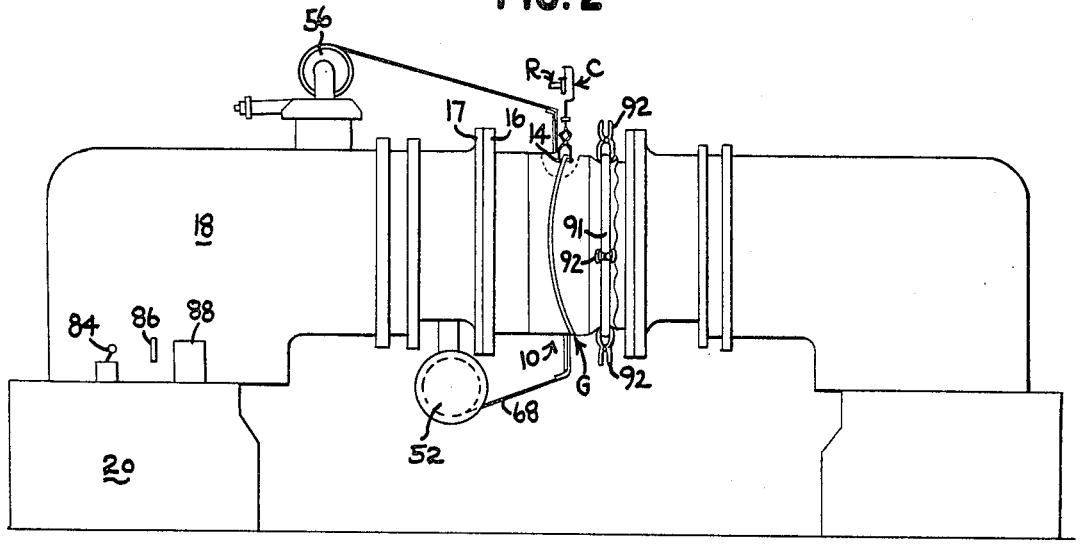
FIG. 3 shows the view of FIG. 2 in the glass engaging position.

FIGS. 2 and 3 are views in transverse section of a pair of glass shaping members 10 and 11 of concave and convex configuration, respectively, disposed in retracted position (FIG. 2) and in glass engaging position (FIG. 3). The concave shaping member 10 has its shaping surfaces 11 of concave configuration, whereas the convex shaping member 12 has its shaping surfaces 13 shaped outward in a convex manner in alignment with the recessed portions of the concave shaping member 10 when vertically supported glass sheets G are engaged therebetween.

While the present invention is depicted in apparatus where glass sheets are supported vertically, it will be understood that it is readily adaptable for use with glass pressing apparatus that shapes heated glass sheets by pressurized engagement when the latter are supported either in a horizontal plane or in any oblique plane as well.

Figure 4:
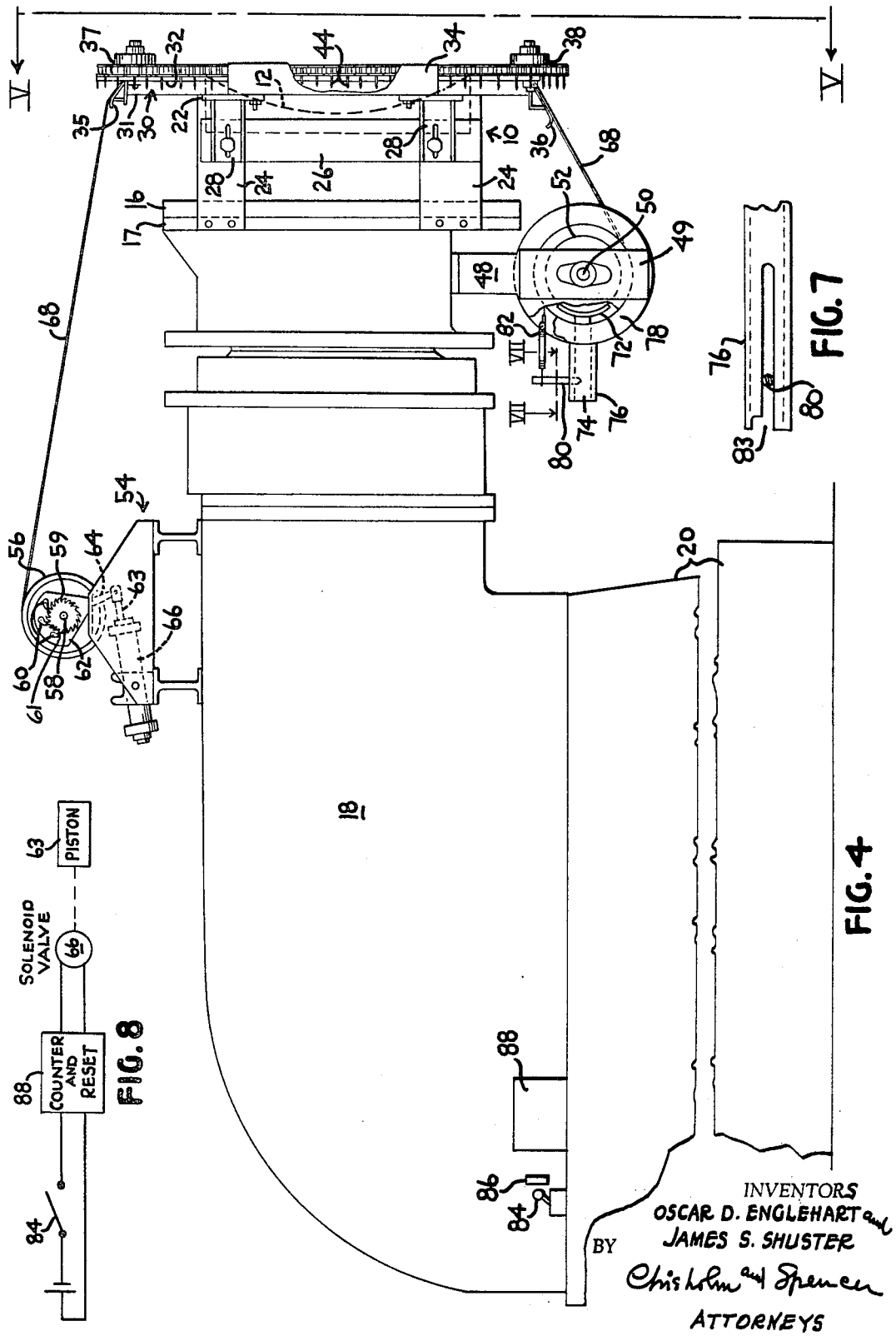
FIG. 4 is a detailed side view of a concave glass shaping member constructed according to the present invention.
Figure 5:
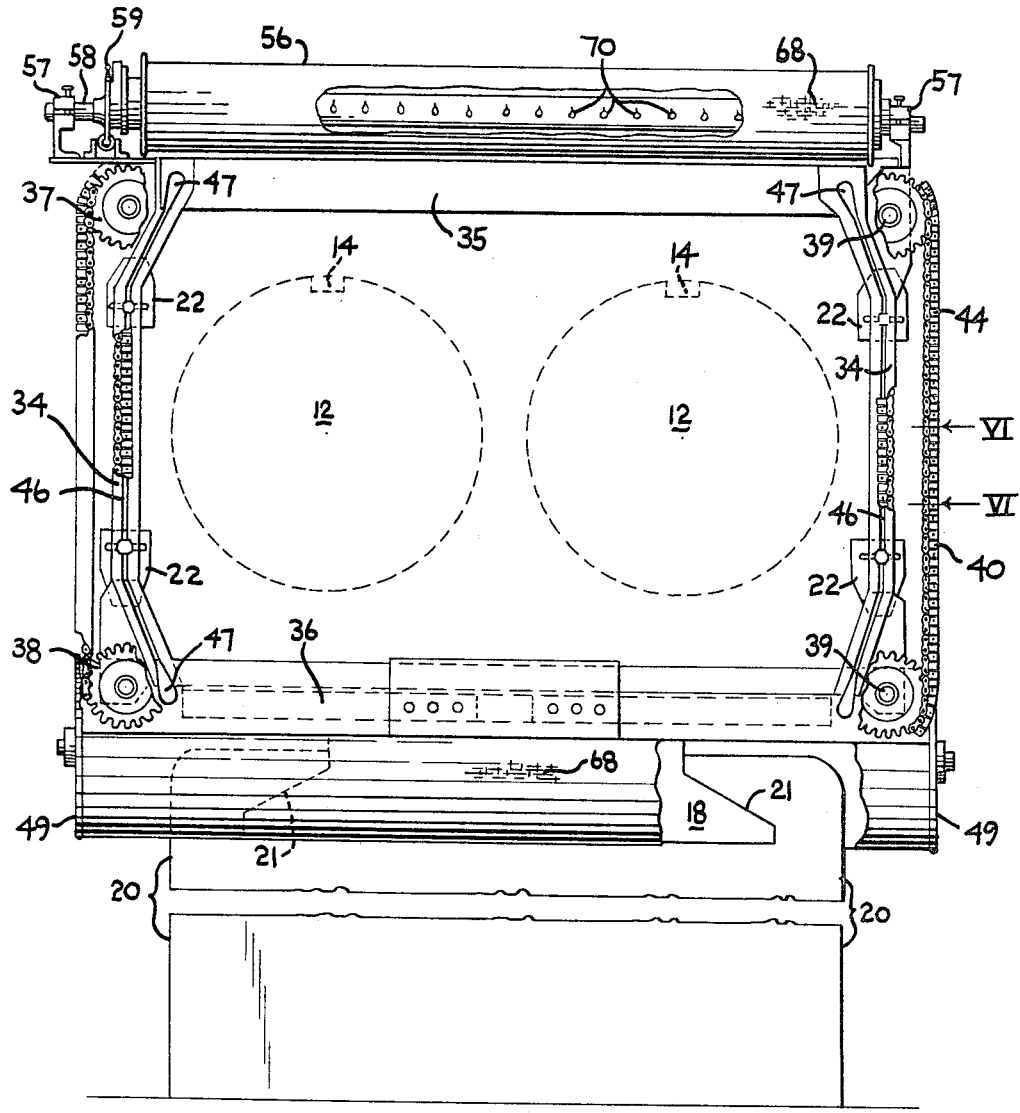
FIG. 5 is a front view of the glass shaping member shown in FIG. 4 taken along the lines V—V thereof.

Referring to FIGS. 4 and 5, the concave glass shaping member 10 is shown with a pair of concave shaping surfaces 12 complementary to convex shaping surfaces 13 of the convex glass shaping member 11. Both shaping members are notched at 14 to provide clearance for tongs which grip the upper edge of a pair of glass sheets simultaneously bent on the apparatus presently described. It is understood, however, that while apparatus for press bending two glass sheets simultaneously is disclosed, that any apparatus capable of shaping one or more glass sheets simultaneously by press bending may use this invention.

The shaping member having a concave surface is shown provided with a special apparatus for covering its shaping surface according to the present invention. This does not necessarily limit the apparatus used to the concave shaping member, because it is also possible to apply the principles of the present invention to a shaping member having a convex shaping surface as well.

The concave glass shaping member 10 has at its rear an attachment plate 16. The latter is removably attached to a front end plate 17 of a ram 18 which moves longitudinally relative to a support structure 20 on machined ways 21 in a manner well known in the glass press bending art.

The gist of the present invention involves novel means for periodically moving glass cloth cover material between the concave shaping surface 12 and the surface of the heat-softened glass sheet engaged by the concave surface 12 in such a manner that the cover can be adjustably positioned or moved with respect to the shaping surface 12 when the glass shaping member 10 is in retracted position after completing a predetermined number of successive pressing operations before the cover is frayed by the shearing action which occurs at the perimeter of the concave shaping surfaces. It is also understood that the arrangement described herein for the concave shaping member can be applied to the convex shaping member which opposes the concave shaping member and engages the opposite surface of the heat-softened glass sheet in pressurized engagement.

A typical arrangement which has been employed successfully comprises two pairs of slotted brackets 22 permanently attached to each side of the ram 18 by horizontal attachment plates 24, vertical connecting plates 26 and slotted adjustment brackets 28.

A vertical channel 30 having front and rear vertical legs 31 and 32 is interconnected between slotted brackets 22 at its rear vertical leg 31 on each side of the shaping member. The front vertical leg 32 of vertical channel 30 is rigidly attached to a bent slotted bracket 34.

An upper guide plate 35 extends obliquely upward and rearward from the upper portions of slotted brackets 34. A lower guide plate 36 extends downward and rearward from the lower portions of slotted brackets 34. The upper guide plate 35 traverses the space connecting the upper portion and the lower guide plate 36 traverses the space adjacent the lower portion of slotted brackets 34.

An upper sprocket 37 and a lower sprocket 38 are freely pivoted to axles 39. The latter are fixed to the upper and lower portions of the front vertical leg 32 of each vertical channel 30.

Figure 6:
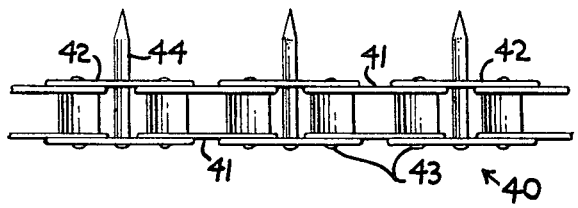
FIG. 6 is a detailed enlarged fragmentary view of a chain drive for said apparatus taken along the lines VI—VI of FIG. 5.

A chain 40 is mounted for free movement in a vertical cyclic path between sprockets 37 and 38 on each side of the shaping member 10. As seen in FIG. 6, the chain comprises alternate links 41 and 42 pivotally connected via pivot pins 43. Links 41 are normal chain links. Alternate links 42 contain pointed pins 44 extending parallel to the pivot pins 43. The pointed ends of pins 44 extend rearward of the glass shaping surface 12 of the glass shaping member 10 for reasons to be explained later.

Each bent slotted bracket 34 has a vertically extending slot 46 widened at its upper and lower ends. The slots 46 receive and guide the pointed pins 44 that move with the inner runs of chains 40. The rearwardly bent enlarged ends 47 of slots 46 facilitate engagement and disengagement of the pins 44 within the slots 46 whenever the chains 40 are moved relative to brackets 34.

A transverse bracket 48 is attached to the bottom of ram 18. A pair of vertical brackets 49 extend downward from the transverse bracket 48 to receive the ends of an axle 50 about which a supply roll 52 is mounted. The supply roll contains a continuous web of knit fiber glass.

An additional support structure 54 is mounted to the top of ram 18 to support a take-up or receiving roll 56. A pair of bearing supports 57 is provided to support an axle 58 on which the take-up roll 56 is mounted.

A ratchet wheel 59 is rigidly attached to axle 58 to rotate therewith. A series of pawls 60 having pointed teeth 61 are mounted in an arcuate arrangement on a reciprocating plate 62. The latter is pivotally mounted to the axle 58. The pawls 60 are freely mounted to have their pointed teeth 61 free to drop by gravity to engage the recesses in the ratchet 59 to rotate the latter from position to position as will be described later.

A piston 63 is attached to an arm 64 extending outward from reciprocating plate 62 to reciprocate the latter and its freely suspended pawls about an axis defined by axle 58. A solenoid valve 66 is provided to actuate piston 63 in a manner to be described later.

Whenever piston 63 is extended, arm 65 and its plate 62 rotates counterclockwise about axle 58, thus causing the pointed teeth 61 of pawls 60 to engage and rotate ratchet 59 in a counterclockwise direction a finite distance about axle 58. When piston 63 is retracted, plate 62 rotates clockwise with pawls 60 free to move relative to the ratchet wheel 59 and to engage other teeth to lock the take-up or receiving roll 56 in position between movements of piston 63.

While a ratchet wheel and pawl arrangement is described herein, it is understood that any functional equivalent thereof may be substituted, such as an overrunning clutch, etc. Also, any other well-known actuating device may replace the solenoid valve 66 and piston 63 without departing from the spirit of the present invention.

A ribbon of fiber glass cloth 68 extends from the supply roll 52 over the lower surface of the lower guide plate 36. From there, the ribbon 68 continues upward over the front surface of slotted brackets 34.

Pointed pins 44 pierce the side edge portions of the ribbon 68 at the widened lower ends 47 of slots 46 beyond the portion of the fiber glass cloth that covers the shaping surface 12. This provides a piercing grip on the ribbon that prevents wrinkling of the portion of the ribbon covering the shaping surface 12.

The bent slotted brackets 34 are located rearward of the datum plane of the shaping surface 12 of glass shaping member 10. This causes the fiber glass cloth ribbon to be stretched slightly over the concave shaping surface 12. In addition, the slots 46 diverge laterally from one another to cause the pointed pins 44 to stretch the ribbon 68 slightly in a direction transverse to its length.

The ribbon 68 continues vertically and rearwardly over the front surface of the obliquely extending upper guide plate 35. At this point, the pointed pins 44 are disengaged from the ribbon 68 and the later extends rearward toward the take-up roll 56. The latter is provided with axially aligned pins 70 to grip the forward end of the ribbon to the take-up roll.

The above structure causes the ribbon 68 to move up across the face of the shaping surface 12 whenever the take-up roll 56 rotates counterclockwise. The pins 44 that pierce the ribbon 68 follow the latter's movement with pins becoming disengaged at the upper end of the slot 46 while new pins pierce the ribbon at the bottom end of the slot. As the slots 46 diverge from their upper and lower ends 47, they cause the pointed pins 44 to separate from one another slightly, thus insuring that enough tension is applied to the portion of the ribbon that covers the shaping surface 12 to insure against its wrinkling.

The supply roll 52 of knit fiber glass cloth is prevented from unwinding too rapidly by a curved brake shoe 72. The latter is spring loaded to bear against the outer surface of the supply roll 52 by the following structure. A rod 74 is attached to the rear of the brake shoe 72 and rides within a sleeve 76. The latter is rigidly attached to an arcuate guard 78 attached to one of the brackets 49 upon which the supply roll 52 is rotatably mounted. Sleeve 76 is slotted to receive a post 80. A spring 82 attaches the post 80 to the arcuate guard 78.

The post 80 is threaded to the free end portion of the rod 74 opposite the end attached to the brake shoe 72. Thus spring 82 tends to pull the post 80 toward the arcuate guard 78. This pull urges the rod 74 and its attached brake shoe 72 to bear against the supply roll 52 mounted about the axle 50 carried by brackets 49.

The slotted sleeve is notched at 83 to receive the post 80 in a retracted position. This holds the brake shoe 72 in a retracted position to allow replacement of a supply roll 48 on the axle 50.

It is understood that the brake shoe construction is only one of a plurality of functional equivalents that cooperate with the pins 70 on receiving roll 56 and the pointed pins 44 extending through slots 46 to tension the ribbon 68 to prevent the portion thereof covering shaping surfaces 12 from wrinkling. Other well-known devices may also be used.

Referring to FIGS. 2 and 3, a limit switch 84 is supported on support 20 for engagement by an actuating arm 86 on ram 18 whenever the shaping member 10 moves to the retracted position shown in FIG. 2. Each time limit switch 84 is actuated, it actuates a counter 88 (FIG. 8). The latter is adjusted to actuate the solenoid valve 66 after a predetermined number of retractions. Each time the solenoid valve actuates the piston 63, the ribbon 68, which serves as a cover for the concave shaping member 10, is moved a short distance relative to the concave shaping surface, thus providing a new area of cover overlapping the area of cover previously used during the previous series of pressings.

FIG. 8 shows a schematic circuit diagram for controlling the movement of the cover 68 after a predetermined number of shaping operations. Limit switch 84 is connected to a counter and reset circuit 88. The latter may be any type of electrical counter or stepping switch, such as Eagle Timer Model HZ–4ZA6, manufactured by the Eagle Signal Company of Moline, Ill. The latter is capable of actuating a solenoid valve after a series of from 1 to 19 actuations.

The counter 88 is electrically connected to the solenoid valve 66 to actuate piston 63 after a preset number of actuations by the limit switch 84. Thus, the ratchet wheel 59 is rotated by the counterclockwise rotation of the pawls 60 in response to outward movement of the piston 63 when the shaping member is retracted for the predetermined number of times selected. The number selected is the maximum number determined by experience that an incremental portion of the fiber glass ribbon is capable of withstanding without fraying as it is exposed to different portions of the shaping member from one end of its shaping surface to its other end.

Since the convex shaping member 11 is not as harmful to the knit fiber glass cloth cover material as the concave shaping member 10, its cover 90 may be attached as in the prior art to a frame-like connecting member 91 located behind the shaping surface 13 and in front of attachment plate 16 by clamps 92 distributed around the perimeter of the frame 91 in a manner well known in the art. This method of attaching the cover 90 for the convex shaping member 11 precludes periodic advancement of the cover relative to the shaping surface and for bending very complex shapes, it may also be necessary to use a similar cover indexing mechanism for the complementary shaped convex shaping member.

In a typical operation, the counter 88 is set to actuate the solenoid valve 66 after 8 successive retractions of the concave shaping member 10. This piston 63 and the arm 64 of the reciprocating plate 62 and the ratchet wheel 59 and pawls 60 were so constructed that the ribbon 68 was moved about 2 inches.

In another operation, the counter 88 was eliminated and the ribbon 68 advanced approximately ¼ inch each time the concave shaping member 10 was retracted.

The form of the invention shown and described in the above disclosure represents an illustrative preferred embodiment thereof. It is understood that various changes may be made without departing from the spirit of the invention as defined in the claimed subject matter that follows.

What is claimed is:

1. In an apparatus for bending glass sheets between opposed shaping members having complemental shaping surfaces and including a cover in ribbon form made from a material suitable to withstand the glass bending operations extending across at least one of said shaping surfaces, the improvement comprising means, located on one side of the shaping member, for storing said cover, means located on the opposite side of the shaping member, to index said cover across said one shaping surface between shaping operations, means responsive to the retracted position of said shaping surface for actuating said cover indexing means, and means for controlling the distance said cover is indexed by said indexing means to a predetermined distance equal to a small portion only of the length of said shaping member.

2. The improvement according to claim 1, wherein said actuating means for actuating said indexing means is responsive to each retraction of said shaping member to actuate said indexing means said predetermined distance between each successive shaping operation.

3. The improvement according to claim 1, further including counting means for counting successive shaping operations and actuating means for actuating said indexing means after a predetermined number of successive shaping operations.

4. The improvement according to claim 3, wherein said complemental shaping surfaces are convex and concave, respectively, a cover extends across each of said shaping surfaces, means is provided for indexing said cover for said concave shaping surface after a predetermined number of shaping operations and separate means is provided for indexing said cover for said convex shaping surface after a predetermined number of shaping operations.

5. The improvement according to claim 1, wherein said complemental shaping surfaces are convex and concave, respectively, and said cover extends across said concave shaping surface.

6. The improvement according to claim 1, further including means to lock said cover storing means and means to lock said cover indexing means in position during shaping operations.

7. The improvement according to claim 1, further including means to hold said ribbon in unwrinkled condition over said shaping surface.

8. The apparatus according to claim 7, wherein said means to hold said ribbon in unwrinkled condition comprises a pair of free running chains disposed on each side of said shaping member, a plurality of pointed pins disposed along each of said chains, and means for guiding said pins into and out of piercing engagement with the side edges of a portion of said ribbon disposed over said shaping surface.

References Cited
UNITED STATES PATENTS

| | | | |
|---|---|---|---|
| 3,077,753 | 2/1963 | Dammers | 65—106 |
| 3,265,484 | 8/1966 | Ritter | 65—106 X |
| 3,329,494 | 7/1967 | Carson et al. | 65—287 |

DONALL H. SYLVESTER, *Primary Examiner.*

ARTHUR D. KELLOGG, *Examiner.*